(12) United States Patent
Hell et al.

(10) Patent No.: US 6,934,079 B2
(45) Date of Patent: Aug. 23, 2005

(54) CONFOCAL MICROSCOPE COMPRISING TWO MICROLENS ARRAYS AND A PINHOLE DIAPHRAGM ARRAY

(75) Inventors: Stefan Hell, Göttingen (DE); Rainer Pick, Göttingen (DE)

(73) Assignee: Max-Planck-Gesellschaft zur Förderung der Wissen-schaften e. V., München (DE)

( * ) Notice: Subject to any disclaimer, the term of this patent is extended or adjusted under 35 U.S.C. 154(b) by 0 days.

(21) Appl. No.: 10/980,552

(22) Filed: Nov. 3, 2004

(65) Prior Publication Data

US 2005/0094261 A1 May 5, 2005

Related U.S. Application Data

(63) Continuation of application No. PCT/EP03/04470, filed on Apr. 29, 2003.

(51) Int. Cl.$^7$ ............................................... G02B 21/00
(52) U.S. Cl. ........................ 359/368; 359/233; 359/235; 359/389
(58) Field of Search ................................. 359/233, 234, 359/235, 368, 381, 384, 385, 389, 621, 622

(56) References Cited

U.S. PATENT DOCUMENTS 5,162,941 A * 11/1992 Favro et al. ................. 359/386
5,633,751 A * 5/1997 Tanaami et al. ............. 359/368
5,717,519 A * 2/1998 Sugiyama et al. ........... 359/368
5,969,846 A * 10/1999 Kishi .......................... 359/227

* cited by examiner

Primary Examiner—Mark A. Robinson
(74) Attorney, Agent, or Firm—Thomas, Kayden, Horstmeyer & Risley, LLP (57) ABSTRACT

A confocal microscope comprises a microlens array having a plurality of microlenses for splitting a ray bundle of illumination light into a plurality of convergent partial ray bundles which illuminate a sample simultaneously at several measuring points; a beam splitter for separating a beam path of the illuminating light and a beam path of sample light originating from the illumination of the sample and captured in an inverse direction with regard to the illumination light; a pinhole diaphragm array having a plurality of pinhole diaphragms arranged in the beam path of the sample light and corresponding to said microlenses of said microlens array splitting the illumination light; and a further microlens array having a plurality of microlenses corresponding to said microlenses of said microlens array splitting the illumination light. Said microlenses of said microlens array splitting the illumination light and said microlenses of said further microlens array are arranged in the beam path of the sample light. Said beam splitter is arranged in an area between said microlens array splitting the illumination light and said further microlens array; and said pinhole diaphragms of said pinhole diaphragm array are not arranged in the area between said microlens array splitting the illumination light and said further microlens array.

20 Claims, 8 Drawing Sheets

Fig. 7 ures as the microlens
CONFOCAL MICROSCOPE COMPRISING TWO MICROLENS ARRAYS AND A PINHOLE DIAPHRAGM ARRAY

CROSS REFERENCE TO RELATED APPLICATIONS

This application is a continuation of International Patent Application PCT/EP03/04470 filed Apr. 29, 2003 and claiming priority to co-pending European Patent Application No. 02009913.1 filed May 3, 2002, both of which are entitled "Konfokales Mikroskop mit zwei Mikrolinsenarrays und einem Lochblendenarray".

FIELD OF THE INVENTION

The invention relates to a confocal microscope with a microlens array for splitting a ray bundle of illumination light into a plurality of convergent partial ray bundles, in order to illuminate a sample simultaneously at several measuring points, a beam splitter for separating the beam path of the illumination light and of the sample light originating from the illumination of the sample and captured in an inverse direction with regard to the illumination light, and a pinhole diaphragm array in the beam path of the sample light which corresponds to the microlens array for splitting the illumination light.

Inter alia the invention relates to confocal fluorescence light microscopes in which the sample light is emitted by the sample because of a decaying energy state excited by the illumination light.

Further, the invention particularly relates to such confocal microscopes of the kind described at the beginning in which a scanning device is provided for moving the microlens array and the pinhole diaphragm array synchronously in parallel to their planes of main extension to scan the sample in-plane. Additionally, the sample may also be scanned in the perpendicular z-direction to three-dimensionally record the sample. All further units of the microscope besides the microlens array and the pinhole diaphragm array may be constructed in such a way that they are common to all partial ray bundles of the illumination light and the captured sample light, i.e. that they are neither divide the illumination light into the single partial ray bundles nor the sample light in a corresponding way. Thus, for example, as a rule one common objective is provided for all partial ray bundles. In the same way, any ocular is also common to all parts of the sample light.

BACKGROUND OF THE INVENTION

It is known that the spatial resolution in measuring a sample in z-direction is increased in a confocal microscope by means of a pinhole diaphragm arranged at a point which is equivalent to the desired measuring point. In a microscope of the kind described at the beginning this increase is achieved with regard to all measuring points. I.e. the pinhole diaphragms of the pinhole diaphragm array are arranged in the beam path of the sample light at points which are equivalent to the measuring points. At the same time, the position of the measuring points is defined by the division of the ray bundle of illumination light into the partial ray bundles by means of the microlens array as each measuring point is the projection of a focus of a convergent partial ray bundle into the sample. In so far, the microlens array and its arrangement have to correspond to the pinhole diaphragm array and its arrangement.

A confocal scanning fluorescence microscope comprising two microlens arrays and a pinhole diaphragm array is known from U.S. Pat. No. 5,717,519 A. Here, the microlens array is realised as a microlens wheel, which is arranged in parallel to a so called Nipkow-disc which forms the pinhole diaphragm array. The microlens wheel and the Nipkow-disc may be rotated about a common rotating axis running perpendicular to their respective planes of main extension so that a scanning device for the sample is realized. A Nipkow-disc is a rotating disc with a spiral-shaped arrangement of pinhole diaphragms around the rotating axis. In the known confocal microscope the ray bundle of illumination light first passes through the microlenses of the microlens wheel. As a result, the illumination light is split up into a plurality of convergent partial ray bundles. The focus of each partial ray bundle is in the area of the passage way of a pinhole diaphragm of the Nipkow-disc. The beam splitter which deviates the sample light coming from the sample through the Nipkow-disc in front of the microlens wheel laterally towards a detector is arranged between the microlens wheel and the Nipkow-disc. Particularly, the beam splitter is a dichroitic mirror, which also results into an undesired deflection of the convergent partial ray beams coming from the microlens wheel. To compensate for this deflection, the microlens array and the Nipkow-disc in the known confocal microscope are tilted by a small angle towards the beam axis of the incident beam bundle of the illumination light coming from a laser. In the known confocal microscope the sample light does not pass through the microlenses of the microlens wheel; instead it is prior to that deflected by the dichroitic mirror laterally towards the detector. The high laborious adjustment of the microlens array with regard to the Nipkow-disc is a disadvantage of the known confocal microscope. If essentially the full illumination light coming from the laser is to be used for illuminating the sample in the measuring points, the Nipkow-disc has to be exactly orientated in such a way, that each focus of each convergent partial ray bundle coming from the microlens array exactly falls in the passage way of a pinhole diaphragm of the Nipkow-disc. This means high demands with regard to the parallelism of the microlens wheel and the Nipkow-disc, with regard to their distance and with regard to their rotational orientation about the common rotation axis. Further, the absolute orientation of this rotation axis has to be adjusted exactly to realize the desired compensation for the deflection of the partial ray bundles by the dichroitic mirror. In all that, it has to be considered that the beam splitter is arranged between the m microlens wheel and the Nipkow-disc and that the beam path of the sample light in radial direction from the common rotation axis of the microlens wheel and of the nipkow-disc should not even temporarily be interrupted.

A scanning fluorescence microscope is known from WO 98/28775 A in which the pinhole diaphragm array is omitted for avoiding the laborious adjustment of a pinhole diaphragm array with regard to a microlens array. The spatial resolution in z-direction of the known microscopy is realized by means of a simulation of a pinhole diaphragm array in the area of the detector by means of software, or by means of a two-photon-excitation of the sample in the measuring points. However, the effect of a real pinhole diaphragm array increasing the spatial resolution, i.e. the spatial resolution in z-direction of a real confocal arrangement can not be achieved by a simulating of a pinhole diaphragm array in the area of the detector, and the yield of sample light is comparatively low with a two-photon-excitation of a sample.

Thus, there is a need for a confocal microscope comprising two microlens arrays and a pinhole diaphragm array in which the actual adjustment labour is reduced, and which as a result can be realized at lower cost.

SUMMARY OF THE INVENTION

The invention relates to a confocal microscope comprising a microlens array having a plurality of microlenses for splitting a ray bundle of illumination light into a plurality of convergent partial ray bundles which illuminate a sample simultaneously at several measuring points; a beam splitter for separating a beam path of the illuminating light and a beam path of sample light originating from the illumination of the sample and captured in an inverse direction with regard to the illumination light; a pinhole diaphragm array having a plurality of pinhole diaphragms arranged in the beam path of the sample light and corresponding to said microlenses of said microlens array splitting the illumination light; and a further microlens array having a plurality of microlenses corresponding to said microlenses of said microlens array splitting the illumination light; said microlenses of said microlens array splitting the illumination light and said microlenses of said further microlens array being are arranged in the beam path of the sample light; said beam splitter being arranged in an area between said microlens array splitting the illumination light and said further microlens array; and said pinhole diaphragms of said pinhole diaphragm array being arranged out of the area between said microlens array splitting the illumination light and said further microlens array.

In the new microscope the microlens array for splitting the illumination light is also arranged in the beam path of the sample light. To compensate for the effects of the microlens array on the sample light, a second equivalent microlens array is provided. In the new confocal microscope, the sample light thus passes through two microlens arrays. This means that the microlenses of the microlens array have to have good optical properties, to the end of the measuring points in the sample being imaged by the sample light without distortion. However, microlens arrays having optical properties which are sufficient for that are available. By using them, it is possible to arrange the beam splitter for separating the beam path of the illumination light and of the sample light captured in an inverse direction with regard to the illumination light between the microlens arrays. Particularly, if the ray bundle of the illumination light is a parallel ray bundle, this area is much less critical than the area between the microlens array and the pinhole diaphragm array which is used for arranging the beam splitter in the prior art. Particularly, the distance of both microlens arrays is not critical. So far as the ray bundle of the illumination light is a parallel ray bundle, this distance may theoretically even be unlimited because the sample light running in an inverse direction with regard to the illumination light is also formed into parallel partial ray beams by the microlens array splitting the illumination light. This already results from the fact that the optical path of the illumination light and of the sample light viewed from the sample is the same up to behind the first microlens array. The arrangement of both microlens arrays in the new confocal microscope is comparatively insensitive even with regard to other inaccuracies of the adjustment. The pinhole diaphragm array has additionally to be adjusted with regard to the microlens arrays, but in this step it is not necessary to care for any beam splitter arranged in between.

Particularly with regard to the further microlens array, it is preferred, if all microlenses have the same focus length. This is not absolutely necessary with regard to the first microlens array used for splitting the illumination light. With microlenses of different focal lengths the sample can even be scanned in z-direction. By means of a same focal length of the further microlens array, however, these measuring points are imaged into one plane.

Further, it is preferred, if the two microlens arrays are arranged in parallel to each other, the beam splitter deviating the ray bundle of the illumination light out of the beam path of the sample light. Whereas in the prior art, the illumination light essentially runs straight through the arrangement of the pinhole diaphragm array and the microlens array passing the beam splitter, in the new confocal microscope, the sample light preferably passes the beam splitter without deviation.

Viewing from the sample, the pinhole diaphragm array may either be arranged in front of the microlens array for splitting the illumination light or behind the further microlens array in the new confocal microscope. In any case the pinhole diaphragm array is arranged on a side of one of the microlens arrays pointing away from the beam splitter. The pinhole diaphragm array may thus be directly connected with the respective microlens array over its entire plane. Preferred is an actual embodiment in which the microlens array and the pinhole diaphragm array are formed at two surfaces of one body of refractive material facing away from each other. In this way, a later adjustment of the pinhole diaphragm array with regard to the respective microlens array is not necessary. Instead, the position of the pinhole diaphragm array with regard to the microlens array is fixed by the common body of refractive material.

In the preferred embodiment of the new confocal microscope, a scanning device is provided which synchronously moves both microlens arrays and the pinhole diaphragm array in parallel to their planes of main extension. The two microlens arrays and the pinhole diaphragm array are particularly provided as rotating discs, i.e. as wheels.

To vary the effective size of the aperture of the pinhole diaphragms of the pinhole diaphragm array, a further diaphragm array corresponding to the first diaphragm array may be provided, which is arranged directly in front of or behind the first diaphragm array and which may be moved in parallel to the first diaphragm array. The maximum size of the common passageway cross-section of both pinhole diaphragm arrays is given when the pinhole diaphragm arrays coincide. Upon increasing movement with regard to each other, the size of the common passageway cross-section decreases so that the effective diaphragm aperture of the pinhole diaphragms of the pinhole diaphragm arrays decreases. For example, the diaphragm aperture may be maximized, when the new confocal microscope is used for a two-photon-excitation of the sample in which the spatial resolution in z-direction is already achieved for other reasons. Vice versa, the diaphragm apertures may be minimizes, when the spatial resolution in z-direction should be particularly high in a special case.

With regard to the pinhole diaphragms of each microlens array it is preferred, if there are square, the pinhole diaphragms being moveable with regard to each other in the direction of a square diagonal starting from a full coincidence. The common passageway cross-sections are then always square with decreasing size of the squares. As long as the diaphragm aperture is in total smaller than the focus cross section of the partial ray beam focussed on the diaphragm aperture, the shape of the limitation of the passageway cross-section does not matter.

The adjusting labour required by the new confocal microscope is further reduced in that a beam splitter is used as the beam splitter, which lets the sample light pass through without offset, or which is compensated for offset. These properties of the beam splitter have only to be present for partial ray beams which are totally or essentially parallel and in form of which the sample light is present between the two microlens arrays. Thus, the beam splitter may for example be a beam splitter cube, the additional cube boundary surfaces besides the beam splitting diagonal surface of which would be rather critical in a confocal microscopy according to the prior art. An offset compensation for a semi-transmitting mirror may, for example, be realized by an additional optical plate with plane-parallel surfaces and with a tuned thickness being arranged at an angle of 90° with regard to the semi-transmitting mirror. With regard to the parallel partial beams of the sample light in the area of the beam splitter the different surfaces of the optical arrangement between the two microlens arrays are also not critical here.

BRIEF DESCRIPTION OF THE DRAWINGS

The invention can be better understood with reference to the following drawings. The components in the drawings are not necessarily to scale, emphasis instead being placed upon clearly illustrating the principles of the present invention. In the drawings, like reference numerals designate corresponding parts throughout the several views.

DETAILED DESCRIPTION

Figure 1:
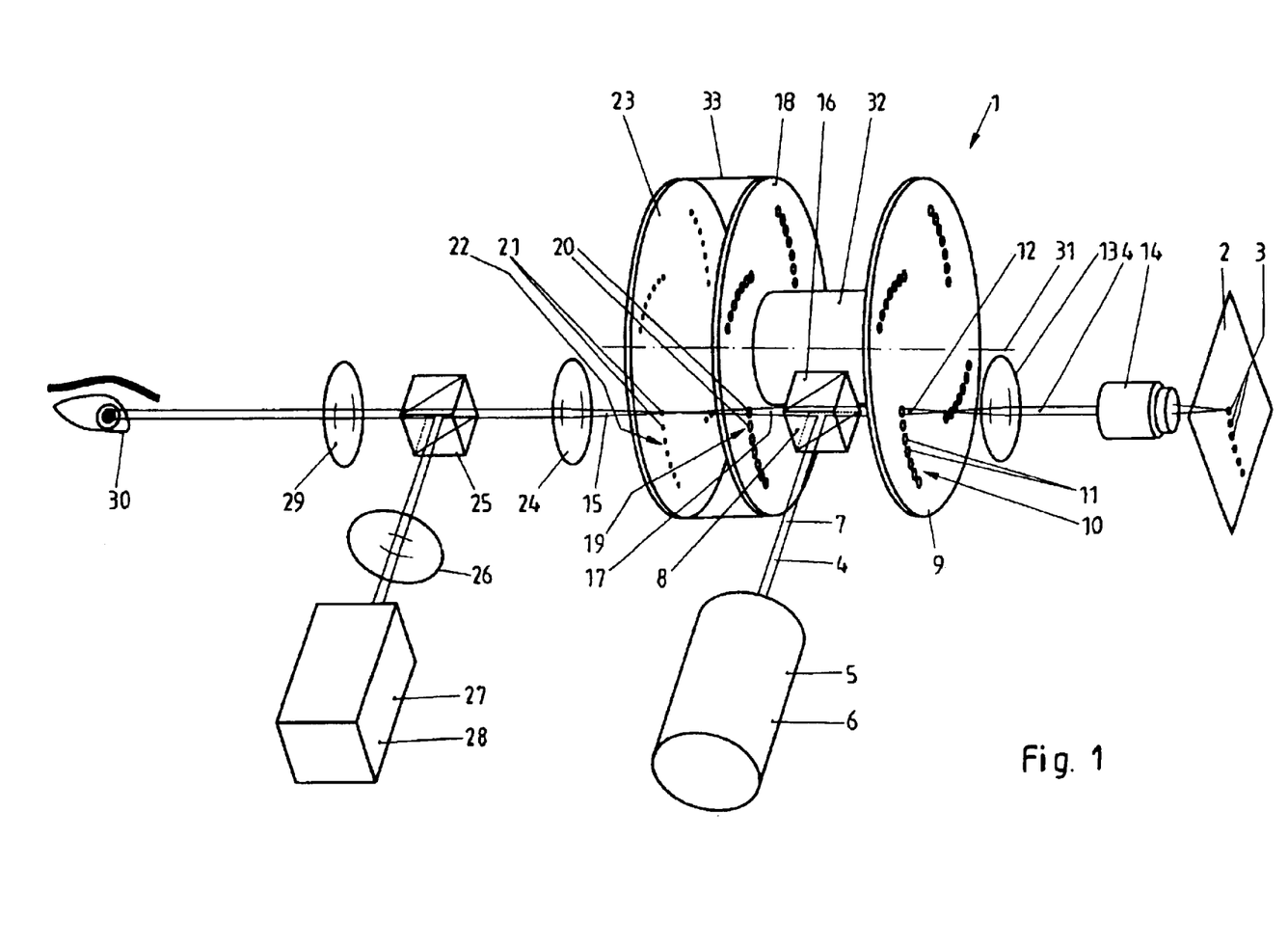
FIG. 1 is a strongly simplified overview over the units of a first embodiment of the confocal microscope.

FIG. 1 shows the basic construction of a confocal microscope 1 for simultaneously measuring a sample 2 in a plurality of measuring points 3. In each of the measuring points, the sample 2 is illuminated by illumination light 4. The illumination light 4 comes from a light source 5 typically being a laser 6. The illumination light coming from the laser 6 is a parallel ray bundle 7. The parallel ray bundle 7 is deviated by a beam splitter 8 towards a microlens wheel 9. The microlens wheel 9 has a microlens array 10 consisting of a plurality of microlenses 11 arranged side by side. The microlens array 10 splits the ray bundle 7 into a plurality of convergent partial ray bundles 12 only one of which being depicted here. Via a tube lens 13 and a microscope objective 14 each partial ray bundle 12 is focussed in one of the measuring points 3. The tube lens 13 and the microscope objective 14 are common to all partial ray bundles 12. In the measuring points 3 the sample 2 is excited for the emission of sample light, if the microscope 1 is a fluorescence microscope, or the sample reflects or scatters the illumination light in the measuring points 3. In any case, the sample light 15 gets to the beam splitter 8 on the same way through the microscope objective, the tube lens 13 and the microlenses 11 of the microlens wheel 9 as the illumination light 4 but in an opposite direction. The beam splitter 8 being a beam splitter cube 16 here transmits the sample light, and thus separates the sample light 15 from the illumination light 4. In the area of the beam splitter 8, the sample light 4 consists of parallel partial ray bundles 17 which reach a second microlens wheel 18. The second microlens wheel 18 has a microlens array 19 made of microlenses 20 which are arranged in equivalent positions to the microlenses 11 of the microlens wheel 9. The microlenses 20 focus the partial ray bundles 17 onto pinhole diaphragms 21 of a pinhole diaphragm array 22 on a pinhole diaphragm wheel 23. Each partial ray bundle 17 is exactly focussed into the diaphragm aperture of one pinhole diaphragm 21. The pinhole diaphragm 21 is confocally arranged with regard to the respective measuring point 3 from which the sample light 15 originates. From the pinhole diaphragm 21 the sample light 15 gets to a detector 27 through a lens 24, via a beam splitter 25 and through a further lens 26, which detector may be a camera 23, or directly into the eye 30 of a person viewing the sample 2 with the microscope 1 through the lens 24, the beam splitter 24 and an ocular 29. Upon synchronously rotating the microlens wheels 9 and 18 and the pinhole aperture wheel 23 about a common rotation axis 31, resulting into scanning the sample 2 with the measuring points 3, a two-dimensional image of the sample 2 is produced. For realizing the adjustment of the microlens wheels 9 and 18 with regard to each other, they may only have a connection 32 to each other in the area of the rotation axis 31, because the beam splitter 3 is arranged between the microlens wheels 9 and 18. The microlens wheel 18, however, may also have a connection 33 to the pinhole diaphragm wheel 23 in the area of its circumference. Thus, there may be a particular stabile unit consisting of the microlens wheel 18 and the pinhole diaphragm wheel 23.

Figure 2:
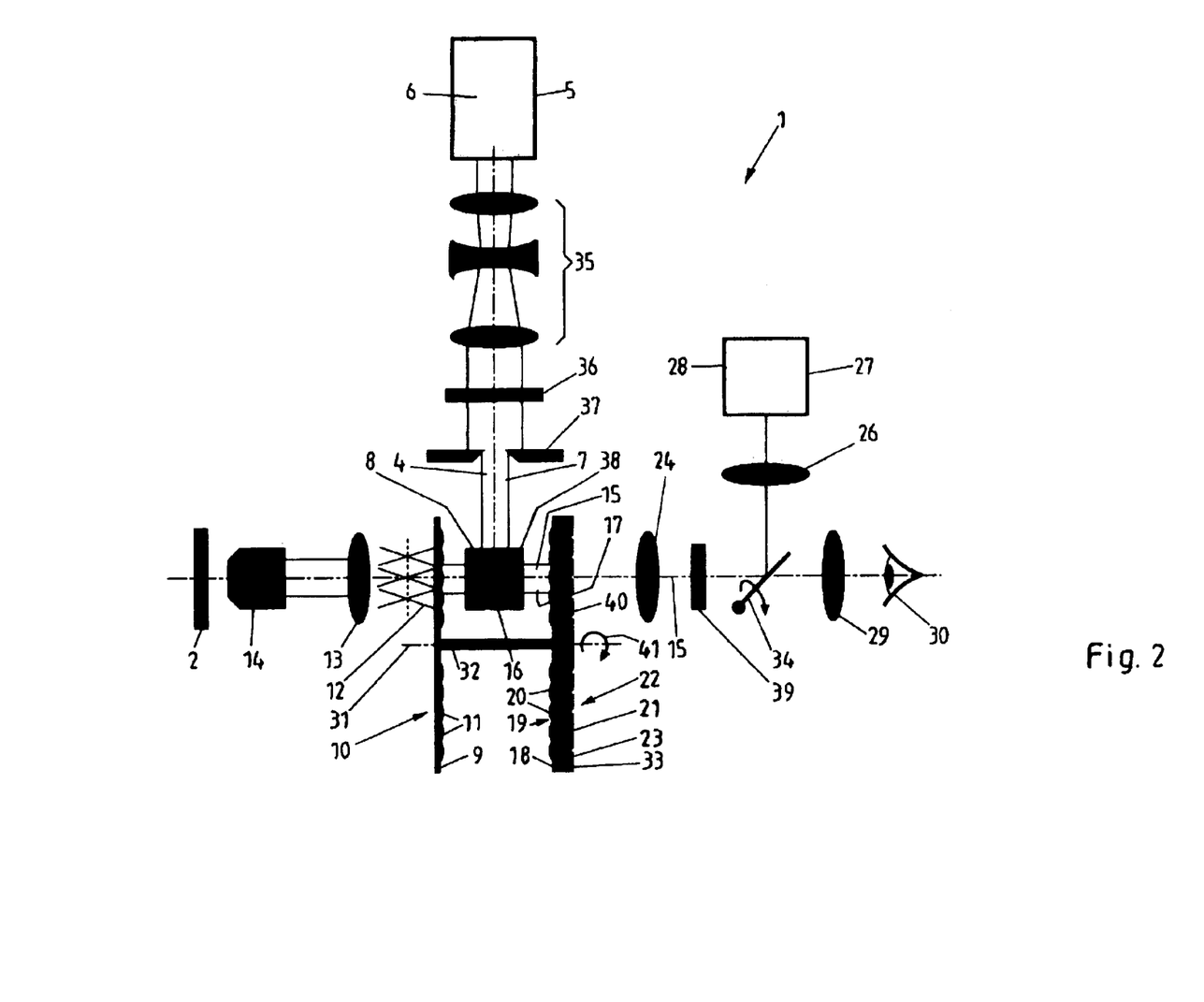
FIG. 2 shows an actual embodiment of the microscope according to FIG. 1 being a fluorescence light microscope.

The more concrete picture of the microscope 1 according to FIG. 2 relates to the embodiment of the microscope 1 being a fluorescence light microscope and comprises various additional optical elements. In contrast to FIG. 1, a mirror 34 which may be tilted into the beam path of the sample light 15 is provided instead of the beam splitter 25, which mirror 34 either lets the sample light 15 pass to the eye 30 or deviates the sample light 15 towards the detector 27. As an additional detail, FIG. 2 comprises a telescope 35 for expanding the illumination light 4 coming from the laser 6. The expanded illumination light 4 passes through a colour filter 36, and, then, the boundary area of the illumination light 4 is cut off with a diaphragm 37. The core area forms the parallel ray bundle 7 which is incident on the beam splitter 8. The beam splitter 8 is a dichroitic beam splitter cube 38 here, which deviates light with a wave length of the illumination light 4 and which lets light with the wave length of the sample light 15 pass through. Correspondingly, a colour filter 39 is arranged in the beam path of the sample light 15. Further, FIG. 2 shows the important detail that the microlens wheel 18 and the pinhole diaphragm wheel 23 are combined to a unit being continuous in the direction of the beam path of the sample light 15. Actually, a body 40 of refractive material is provided, the microlenses 20 being formed at the one surface of which, and the pinhole diaphragms 21 being formed at the opposite surface of which. Thus, a defined spatial arrangement of the pinhole diaphragms 21 is given with regard to the microlenses 20, in which the pinhole diaphragms 21 are exactly at the focus of the microlenses 20. Adjusting the rotatable wheels 9, 18 and 23 with regard to the fixed units of the microscope 1 is thus reduced to adjusting two units. Here, the distance of both microlens wheels 9 and 18 is not critical, because the illumination light 15 has the form of parallel partial ray bundles 17 here.

Figure 3:
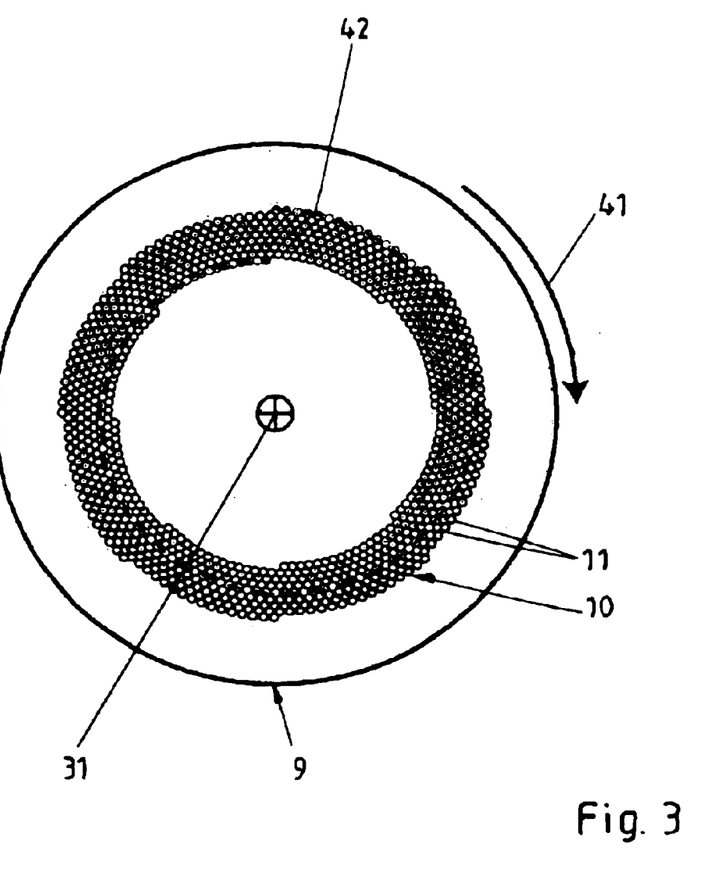
FIG. 3 is a view on a microlens wheel of the microscope according to FIG. 2.

FIG. 3 shows a front view onto the microlens wheel 9. Here, the microlens array 10 and its arrangement of microlenses 11 are well visible. Further, a rotational direction of the microlens wheel 9 is indicated by an arrow 41. The single microlenses 11 are arranged on spiral paths, one of which being high lightened by a dashed line 42. In the area of the microlens array 10, the sample 2 is fully two-dimensionally scanned by turning the microlens wheel 9.

Figure 4:
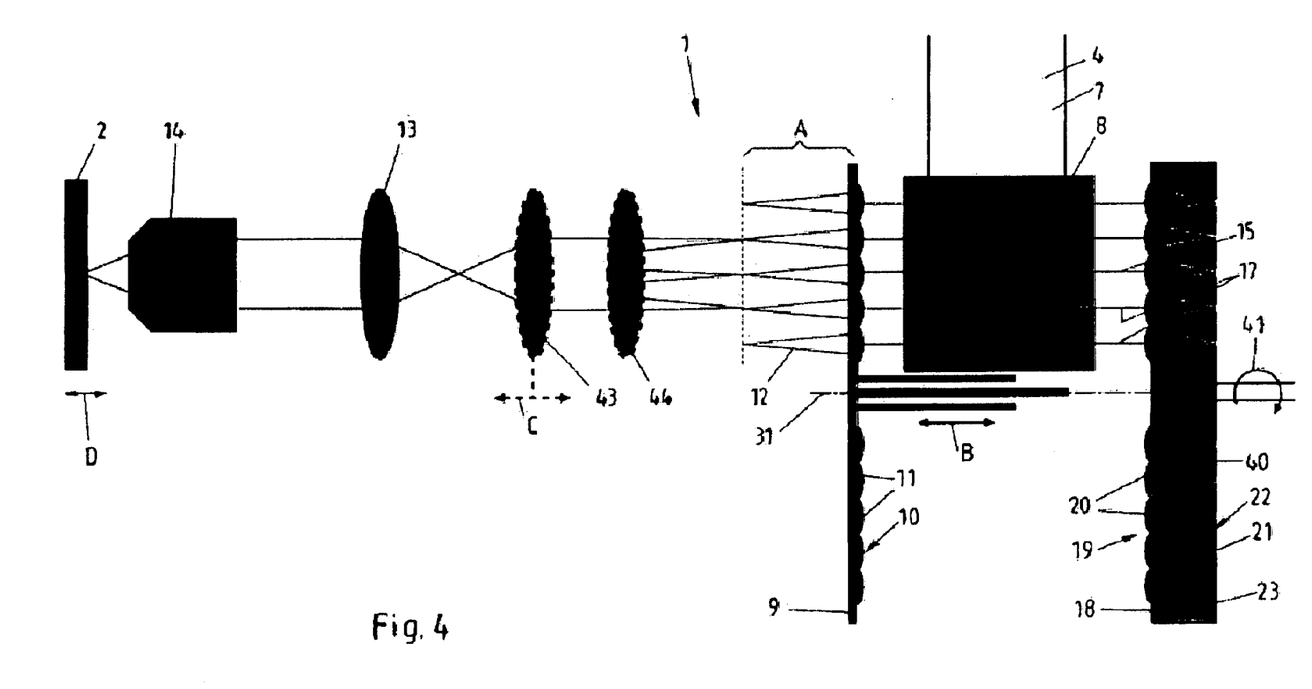
FIG. 4 shows different possibilities of z-direction scanning a sample with the microscope according to FIG. 2.

FIG. 4 sketches different possibilities to additionally scan the sample 2 in z-direction, i.e. in the direction of the beam path of the microscope 1. To this end, the focus lengths A of the microlenses 11 of the microlens wheel 9 may be different. The microlens wheel 9 may also, as a whole, be moved in the direction of a double arrow B in the direction of its rotation axis 31 to achieve scanning the sample 2 in z-direction. Further possibilities are moving a lens 43 of a pair of lenses 43 and 44 in the direction of a double arrow C. Of course, the sample 2 may also be moved in the direction of a corresponding double arrow D in z-direction. Further, FIG. 4 clearly indicates the arrangement of the pinhole diaphragms 21 at the focus points of the microlenses 20 of the microlens wheel 18. The parallel partial ray bundles 17 of the sample light 15 are focussed by the microlenses 20 at these focus points. At the same time, the pinhole diaphragms 21 are confocally arranged with regard to the measuring points on the sample 2.

Figure 5:
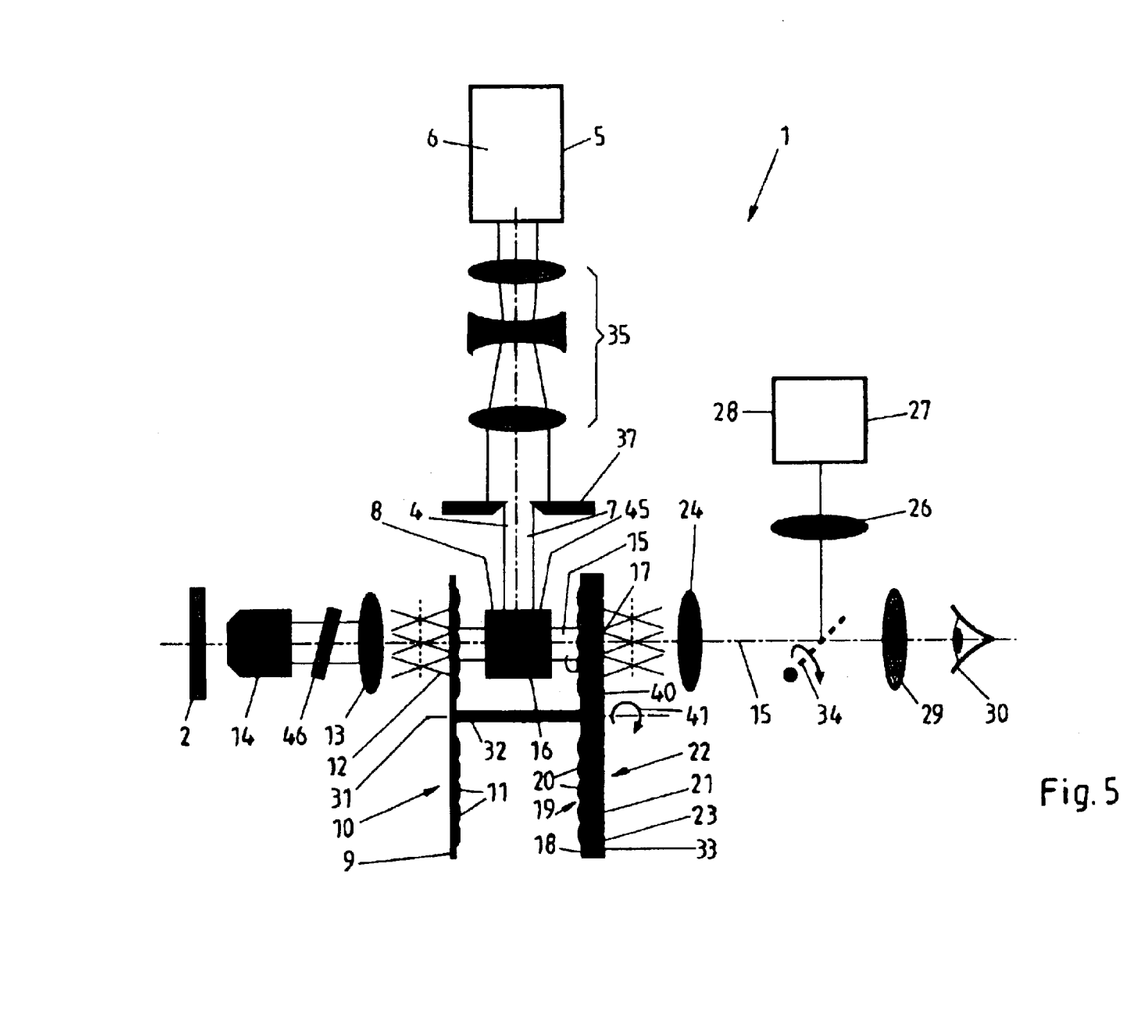
FIG. 5 shows an actual embodiment of the microscope according to FIG. 1 being a reflection light microscope.

The microscope 1 according to FIG. 5 is constructed as a reflection or scatter light microscope in which the sample light 15 is illumination light 4 reflected by the measuring points 3 of the sample 2 so that the sample light has the same or at least nearly the same wavelength as the illumination light. Correspondingly, other means for separating the sample light 15 and the illumination light 4 than in the microscope 1 depicted in FIG. 2 are provided here. The beam splitter 8 is a polarization beam splitter cube 45 here, which deviates illumination light 4 linearly polarized in a certain direction towards the sample 2. A lambda-quarter-plate 46 arranged between the tube lens 13 and the microscope objective 14 changes the polarization of the illumination light 4 into a circular polarization of a certain rotation direction. Because of the reflection of the illumination light 4 in the measuring points 3, the sample light 15 coming back from the sample 2 has a phase altered by 180°, i.e. a circular polarisation having an opposite rotation direction with regard to the illumination light 4, which circular polarization is amended by the lambda-quarter-plate 46 into a linear polarization having a direction turned by 90° as compared to the illumination light 4 prior to the lambda-quarter-plate. Thus, the sample light 5 passes through the polarisation beam splitter cube 45 unaffected. The colour filters 36 and 37 are not provided in the embodiment of the microscope according to FIG. 5. Further, the polarization elements 45 and 46 are not essential for the function of the reflection microscope according to FIG. 5, but they enhance the achievable brightness contrast.

Figure 6:
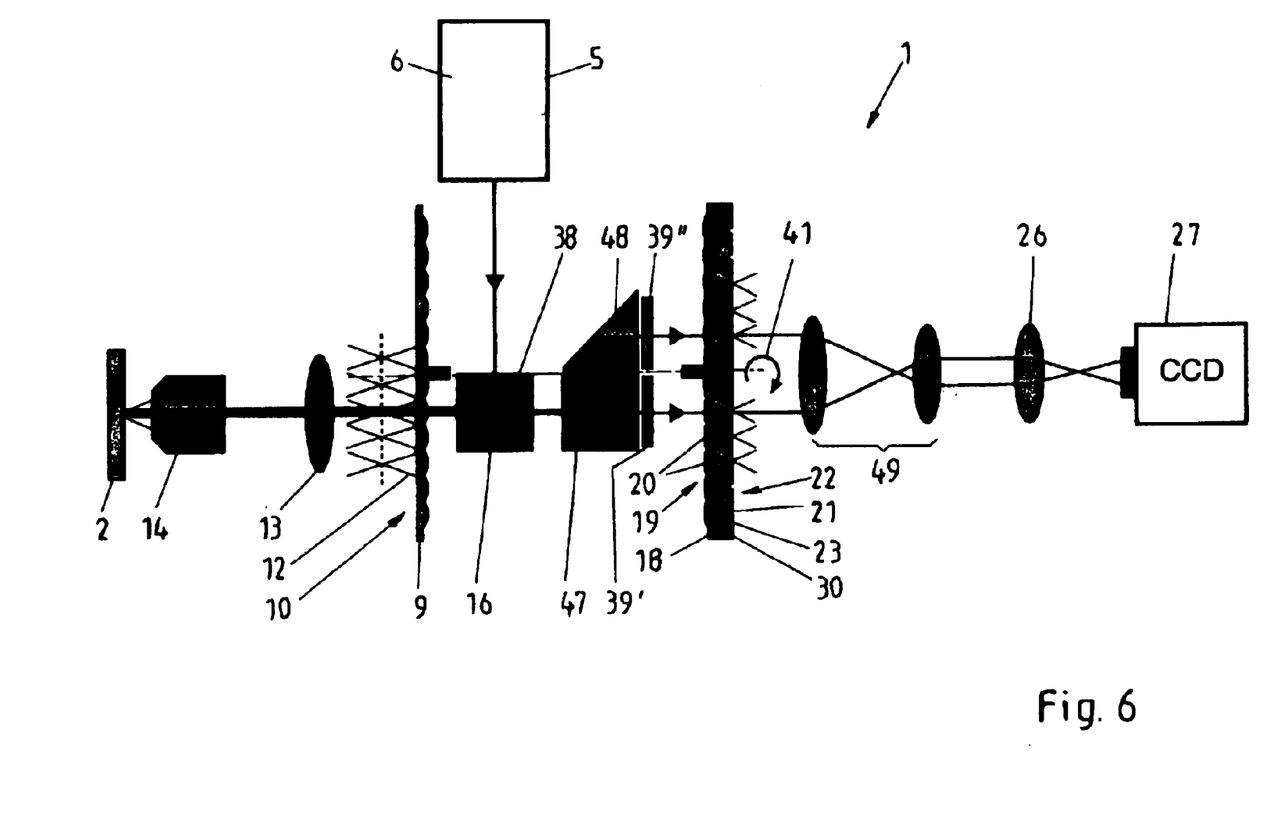
FIG. 6 shows a variant of the microscope according to FIG. 2.

FIG. 6 shows the microscope 1 which is again constructed as a fluorescence microscope and based on a dichroitic beam splitter cube 38. Here, a further beam splitter cube 47 and a deviation prism 48 are additionally provided between the microlens wheel 9 and the microlens wheel 18. These are also dichroitic units which are topped by two colour filters 39' and 39". In this way, sample light of different wave lengths coming from the sample 2 may be separated between the two microlens wheels 9 and 18 and be imaged through different areas of the microlens array 19 and of the pinhole diaphragm array 22 onto the detector 17. Further, a telescope 49 is connected in series to collect the separated colours of the sample light to such an extent that they may be projected onto the detector 27 side by side. The detector 27 thus comprises an image with two or more areas corresponding to different colours of the sample light.

Figure 7:
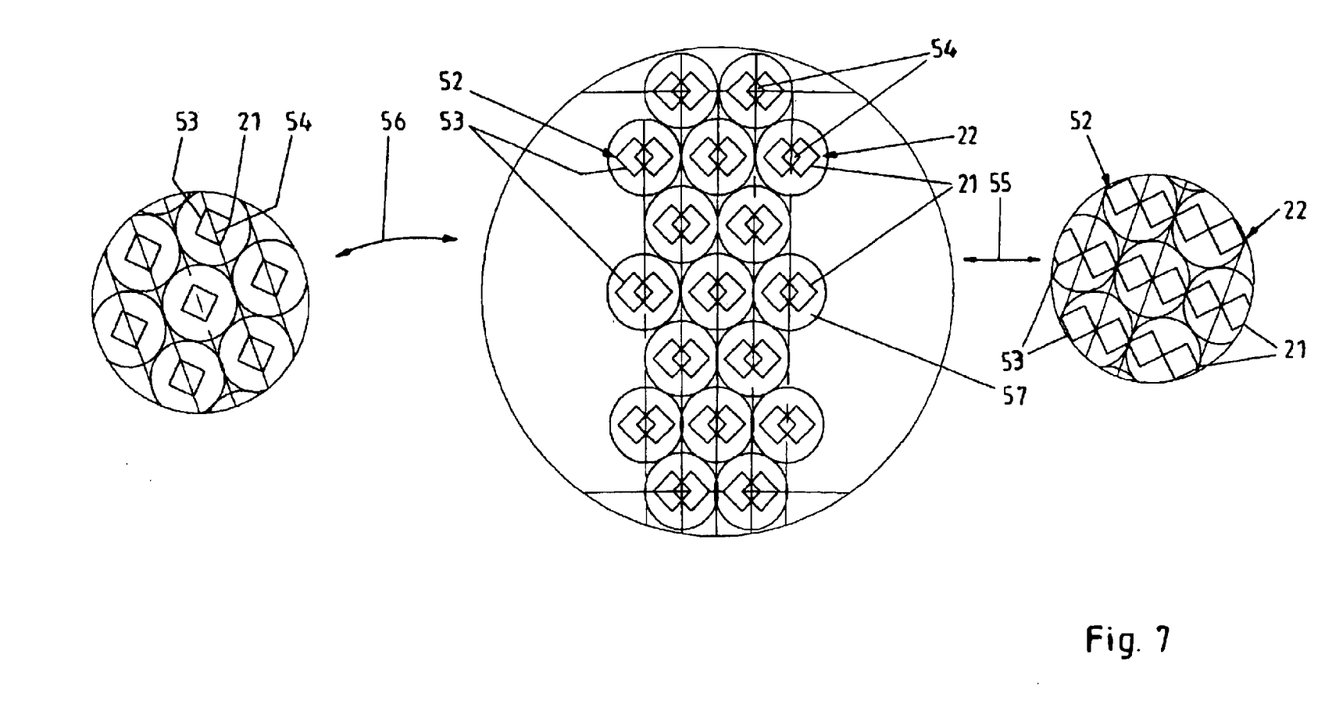
FIG. 7 shows a diagram of the realization of a pinhole diaphragm array with a variable diaphragm aperture.

FIG. 7 is a diagram with regard to the possibility to vary the effective free passageway cross-section of the pinhole diaphragm array 22 and thus of the diaphragm aperture of the confocal pinhole diaphragms. To this end, a further pinhole diaphragm array 52 consisting of pinhole diaphragms 53 is provided, the in-plane arrangements of the pinhole diaphragms 51 and 53 of the pinhole diaphragm arrays 52 and 52 being the same, but may be moved with regard to each other. The free passageway cross-section 54 results from the coincidence of the diaphragm apertures of one pinhole diaphragm 21 and one pinhole diaphragm 53. Actually, the diaphragm apertures of the pinhole diaphragms 51 and 53 are each delimited by squares here, and it is intended to move them with regard to each other in direction of a square diagonal. In the middle of FIG. 7 the arrangement of the pinhole diaphragm arrays 22 and 52 with regard to each other is depicted, which results into free passageway cross-sections 54 of middle size. By moving the pinhole diaphragm arrays 22 in the direction of arrow 55, which actually corresponds to turning the two pinhole diaphragm wheels with regard to each other in an arrangement of both pinhole diaphragm arrays 22 and 52 on pinhole diaphragm wheels, the coincidence of the pinhole diaphragms 21 and 53 is finally lost, which case is depicted on the right hand side of FIG. 7. Here, there is no free passageway cross-section 54 left. By movement in the opposite direction of an arrow 56, the free passageway cross-sections 54 increase until the pinhole diaphragms 21 and 53 are exactly coincident, which case is depicted on the left hand side of FIG. 7. In any case, the free passageway cross-section 54 is smaller than the focus area 57 projected onto the respective pinhole diaphragms 21 and 53, so that the shape of the limitation of the free passageway cross-section 54 by means of a square is not critical. Instead, the shape of the pinhole diaphragms 21 and 53 according to FIG. 7 is advantageous as even in moving them with regard to each other the free passageway cross-section 54 is always delimited by a square and only varies in size.

Figures 8, 9:
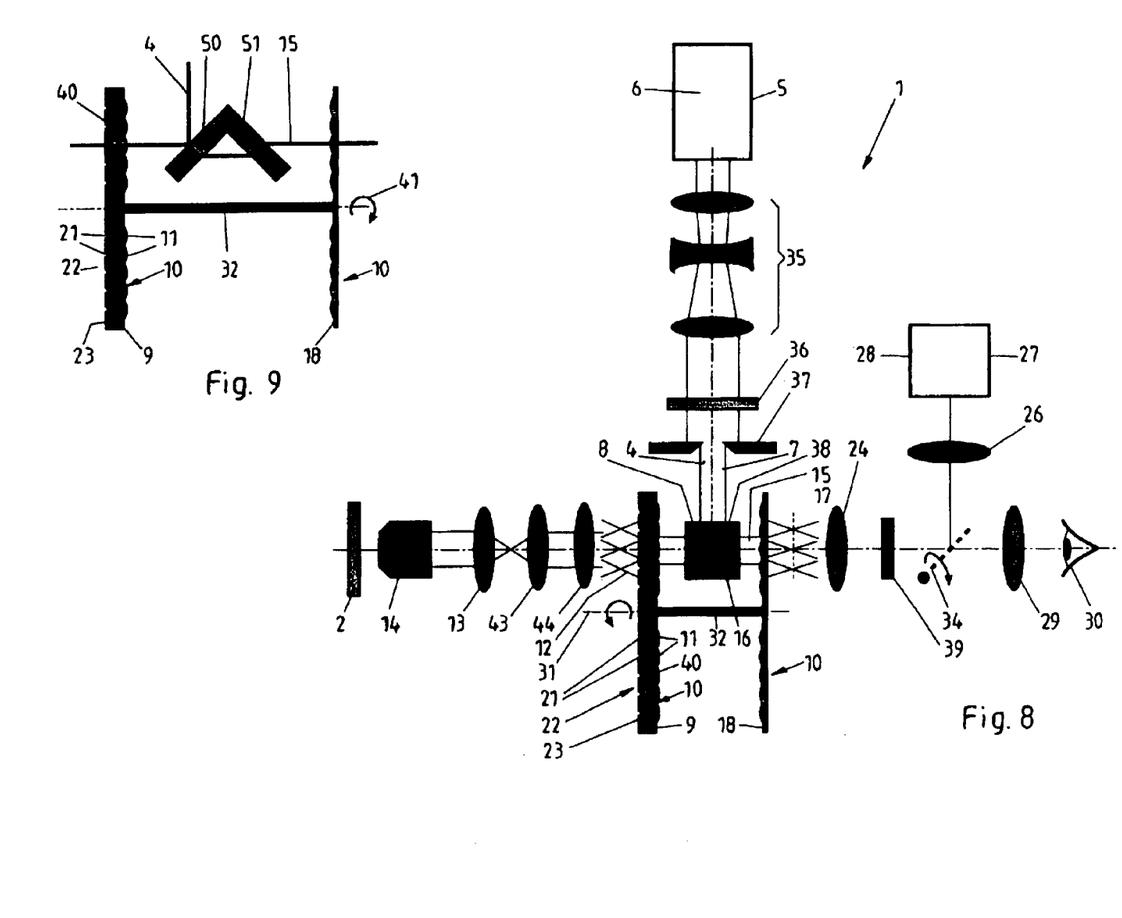
FIG. 8 shows a second basic embodiment of the confocal microscope.
FIG. 9 shows a detail of an alternative embodiment with regard of a microscope according to FIG. 8.

FIG. 8 shows a variant of the embodiment of the microscope 1 according to FIG. 2, the pinhole diaphragm array 22 on the pinhole diaphragm wheel 53 being arranged in front of the microlens array 9 instead of behind the microlens array 18. In this way, the illumination light 4 also passes through the pinhole diaphragms 21. Further, the pinhole diaphragm array 22 is comparatively farer away from the detector 27 or the eye 30. However, there are no principal differences in the function of the microscope 1. In this embodiment there may also be a body 40, the microlenses 11 of the microlens array 10 of the microlens wheel 9 are formed at the one surface of which, and the pinhole diaphragms 21 of the pinhole diaphragm array 21 are positioned at its opposite surface.

FIG. 9 sketches the use of a dichroitic mirror 50 between the microlens wheels 9 and 18 instead of the beam splitter cube 16 in the microscope according to FIG. 8. To compensate for the resulting beam offset caused by the dichroitic mirror 50 with regard to the sample light 50 passing through, an optical plate 51 having plane-parallel surfaces and a tuned thickness is provided in an orthogonal direction with regard to the dichroitic mirror 50. The optical plate 51 reduces the beam offset caused by the dichroitic mirror 50 down to zero.

LIST OF REFERENCE NUMERALS 1 microscope
2 sample
3 measuring point
4 illumination light
5 light source
6 laser
7 ray bundle
8 beam splitter
9 microlens wheel
10 microlens array
11 microlens
12 partial ray bundle
13 microscope objective
14 tube lens
15 sample light
16 beam splitter cube
17 partial ray bundle
18 microlens wheel
19 microlens array
20 microlens
21 pinhole diaphragm
22 pinhole diaphragm array
23 pinhole diaphragm wheel
24 lens
25 beam splitter
26 lens
27 detector
28 camera
29 ocular
30 eye
31 rotation axis
32 connection
33 connection
34 mirror
35 telescope
36 colour filter
37 diaphragm
38 dichroitic beam splitter cube
39 colour filter
40 body
41 arrow
42 dashed line
43 lens
44 lens
45 polarization beam splitter
46 lambda-quarter-plate
47 beam splitter cube
48 deviation prism
49 telescope
50 dichroitic mirror
51 plate
52 pinhole diaphragm array
53 pinhole diaphragm
54 passageway cross-section
55 arrow
56 arrow
57 focus area

We claim:

1. A confocal microscope comprising:
a microlens array having a plurality of microlenses for splitting a ray bundle of illumination light into a plurality of convergent partial ray bundles which illuminate a sample simultaneously at several measuring points;
a beam splitter for separating a beam path of the illuminating light and a beam path of sample light originating from the illumination of the sample and captured in an inverse direction with regard to the illumination light;
a pinhole diaphragm array having a plurality of pinhole diaphragms arranged in the beam path of the sample light and corresponding to said microlenses of said microlens array splitting the illumination light; and
a further microlens array having a plurality of microlenses corresponding to said microlenses of said microlens array splitting the illumination light;
said microlenses of said microlens array splitting the illumination light and said microlenses of said further microlens array being are arranged in the beam path of the sample light;
said beam splitter being arranged in an area between said microlens array splitting the illumination light and said further microlens array; and
said pinhole diaphragms of said pinhole diaphragm array being arranged out of the area between said microlens array splitting the illumination light and said further microlens array.

2. The microscope of claim 1, further comprising a light source providing the ray bundle of illumination light as a parallel ray bundle.

3. The microscope of claim 2, wherein said microlens array splitting the illumination light and said further microlens array are orientated in parallel with regard to each other; said beam splitter deviating the ray bundle of the illumination light onto the beam path of the sample light.

4. The microscope of claim 3, wherein the sample light consists of parallel partial ray bundles in the area between said microlens array splitting the illumination light and said further microlens array.

5. The microscope of claim 1, wherein all of said microlenses of said further microlens array have a same focus length.

6. The microscope of claim 1, wherein said pinhole diaphragm array is arranged in front of said microlens array splitting the illumination light when viewed from the sample.

7. The microscope of claim 6, wherein said pinhole diaphragm array is physically connected to said microlens array splitting the illumination light.

8. The microscope of claim 7, wherein said microlens array splitting the illumination light and said pinhole diaphragm array are provided by two opposite surfaces of a body of refractive material.

9. The microscope of claim 1, wherein said pinhole diaphragm array is arranged behind the further microlens array when viewed from the sample.

10. The microscope of claim 9, wherein said pinhole diaphragm array is physically connected to said further microlens array.

11. The microscope of claim 10, wherein said further microlens array and said pinhole diaphragm array are provided by two opposite surfaces of a body of refractive material.

12. The microscope of claim 10, wherein a scanning device is provided moving said microlens array splitting the illumination light, said further microlens array and said pinhole diaphragm array synchronously in parallel to their planes of main extension.

13. The microscope of claim 12, wherein said microlens array splitting the illumination light, said further microlens array and said pinhole diaphragm array are provided as rotating wheels.

14. The microscope of claim 1, wherein a further pinhole diaphragm array corresponding to said pinhole diaphragm array is provided directly adjacent said pinhole diaphragm array, said further pinhole diaphragm array being movable in parallel to said pinhole diaphragm array for varying the size of common free passageway cross-sections.

15. The microscope of claim 14, wherein the pinhole diaphragms of both said pinhole diaphragm array and said further pinhole diaphragm array are square and wherein said pinhole diaphragm array and said further pinhole diaphragm array are movable with regard to each other.

16. The microscope of claim 15, wherein the pinhole diaphragms of both said pinhole diaphragm array and said further pinhole diaphragm array are movable with regard to each other in a direction of a square diagonal starting from a full coincidence of their pinhole diaphragms.

17. The microscope of claim 1, wherein said beam splitter comprises a beam splitter cube.

18. The microscope of claim 1, wherein said beam splitter comprises a dichroitic mirror combined with a plane-parallel optical plate arranged at an angle of 90° with regard to said dichroitic mirror.

19. A confocal fluorescence light microscope comprising:
- a microlens array having a plurality of microlenses for splitting a ray bundle of illumination light into a plurality of convergent partial ray bundles which illuminate a sample simultaneously at several measuring points;
- a beam splitter for separating a beam path of the illuminating light and a beam path of fluorescence light originating from the illumination of the sample and captured in an inverse direction with regard to the illumination light;
- a pinhole diaphragm array having a plurality of pinhole diaphragms arranged in the beam path of the sample light and corresponding to said microlenses of said microlens array splitting the illumination light; and
- a further microlens array having a plurality of microlenses corresponding to said microlenses of said microlens array splitting the illumination light;
- said microlenses of said microlens array splitting the illumination light and said microlenses of said further microlens array being are arranged in the beam path of the sample light;
- said beam splitter being arranged in an area between said microlens array splitting the illumination light and said further microlens array; and said pinhole diaphragms of said pinhole diaphragm array being arranged out of the area between said microlens array splitting the illumination light and said further microlens array.

20. A confocal reflection light microscope comprising:
- a microlens array having a plurality of microlenses for splitting a ray bundle of illumination light into a plurality of convergent partial ray bundles which illuminate a sample simultaneously at several measuring points;
- a beam splitter for separating a beam path of the illuminating light and a beam path of sample light reflected by the illuminated measuring points of the sample and captured in an inverse direction with regard to the illumination light;
- a pinhole diaphragm array having a plurality of pinhole diaphragms arranged in the beam path of the sample light and corresponding to said microlenses of said microlens array splitting the illumination light; and
- a further microlens array having a plurality of microlenses corresponding to said microlenses of said microlens array splitting the illumination light;
- said microlenses of said microlens array splitting the illumination light and said microlenses of said further microlens array being are arranged in the beam path of the sample light;
- said beam splitter being arranged in an area between said microlens array splitting the illumination light and said further microlens array; and said pinhole diaphragms of said pinhole diaphragm array being arranged out of the area between said microlens array splitting the illumination light and said further microlens array.

* * * * *